United States Patent [19]
Wood et al.

[11] 4,448,020
[45] May 15, 1984

[54] ENERGY GENERATING DEVICE

[75] Inventors: Eric Wood, Northants; Norman W. Bellamy, Coventry, both of England

[73] Assignee: Sea Energy Associates Ltd., Feltham, England

[21] Appl. No.: 398,431

[22] Filed: Jul. 14, 1982

Related U.S. Application Data

[63] Continuation-in-part of Ser. No. 120,265, Feb. 11, 1980, abandoned.

[51] Int. Cl.³ .............................................. F03B 13/12
[52] U.S. Cl. ...................................... 60/398; 60/501; 60/506; 417/332
[58] Field of Search ................. 60/398, 499, 501, 506; 290/42, 53; 417/330, 331, 332

[56] References Cited

U.S. PATENT DOCUMENTS 3,961,863  6/1976  Hooper .............................. 60/501 X
4,077,213  3/1978  Hagen ................................ 60/501 X

FOREIGN PATENT DOCUMENTS 2026621  2/1980  United Kingdom .................. 290/53

Primary Examiner—Allen M. Ostrager
Assistant Examiner—Stephen F. Husar
Attorney, Agent, or Firm—Louis Orenbuch

[57] ABSTRACT

A device for generating power from the energy of waves in a body of liquid employs a buoyant reaction element and at least one displacement element which can move back and forth to react against the reaction element. The movement of the displacement element which is caused by the cyclic application of wave forces is converted into a more readily usable form by a turbine driven by the flow of air or hydraulic fluid caused by the movement of the displacement element. Where the air or hydraulic flow is bidirectional, the turbine can be of the self-rectifying type so that it is driven unidirectionally. The turbine may, for example, drive a generator that produces electrical power. Where a plurality of displacement elements are employed, some of the displacement elements are arranged to be out of phase relative to others of the displacement elements.

12 Claims, 7 Drawing Figures

ENERGY GENERATING DEVICE

This application is a continuation-in-part of our earlier application Ser. No. 120,265 which was filed in the U.S. Pat. and Trademark Office on Feb. 11, 1980. That earlier application was abandoned after the filing of this application.

This invention relates to energy generating apparatus usable for converting to a usable form the energy in waves in a body of liquid such as the sea or ocean.

There are a number of proposals in existence for the conversion of liquid wave energy, and generally speaking a main class of such proposals involves a primary component which is positioned to come under the influence of the waves to be moved back and forth thereby. The back and forth movement is converted into a more usable form, such as electrical energy, by means of a suitable transmission.

In a particular proposal of this class, the primary component is adapted to rock about an axis, and has a lobe at the waveward side which is displaced up and down by the waves (and because of this, it is called a "duck") whilst at the leeward side it does not have any displacement. It is envisaged that a plurality of such ducks should be arranged on a common spine.

The engineering difficulties of designing and manufacturing such ducks, however, even at 1/10th scale, have cast doubt on what otherwise was a promising concept.

There are two further areas of difficulty with the said ducks. First, a spine which is capable satisfactorily of withstanding the anticipated bending moment is required, but does not appear to be available, and second there are problems to be solved concerning the primary power take-off, bearing accessibility, and the robustness of the apparatus to withstand "survival" conditions e.g. storm conditions. It is the second area of problems which has led us to apply some radical thinking on the design of a new energy generating apparatus to replace the said ducks.

According to the present invention there is provided energy conversion apparatus for generating energy from the wave motion of a body of liquid comprising:

(a) an elongated reaction body having a gas filled chamber therein, (b) a plurality of displacement means spaced along and secured to the reaction body at one side thereof, each displacement means providing a compressible enclosure containing a gas, the compressible enclosure having a deflection surface which moves toward and away from the reaction body under the influence of wave forces so that the enclosure acts as a gas pump, (c) a separate gas passageway for each displacement means connecting the interior of the compressible enclosure with the chamber in the reaction body which chamber is common to all displacement means whereby the back and forth movement of each deflection surface causes pumping of gas from the enclosure to the chamber and vice versa through the passageway, and (d) a self-rectifying turbine disposed in the passageway whereby the turbine is driven unidirectionally by movement of fluid along the passageway, the self-rectifying turbine thereby providing output energy.

The specific combination of a self-rectifying turbine and compressible pump units provides a system whereby high energy output with low inertia loads can be obtained.

The apparatus may be for use in a position parallel or at an angle (specifically an acute angle) to the wave front from which the energy is to be extracted, or there may be said deflection surface means arranged side-by-side along each side of the body when the body is to be used in a position at right angles to the wave front from which the energy is to be extracted.

The fluid which is in the cavity and which drives the turbine to produce rotary motion from which, for example, electrical power can be derived, may be air, but where there is some liquid in each said cavity, it is arranged that its level will increase as each displaceable surface means deflects towards the body, due to the heave effect of a wave acting on the displaceable surface means; the increase in level of course means an increase in the head of that liquid and an increase in the force tending to return the displaceable surface means in a swinging direction away from the body.

The said displaceable surface means along the length of the body are such as to be capable of complying with instantaneous wave displacement along the length of the body so that different displaceable surface means on the body can move out of phase, and the chamber may be a conduit forming a coupling means interconnecting said cavities so that when wave forces push some displaceable surface means towards the body, other displaceable surface means on which the wave forces are out of phase are forced away from the body.

The body when buoyantly supportable preferably has suitable ballasting to ensure that it floats in a predetermined position in the liquid, and it is preferred that, for stability, the body is relatively massive compared to an individual displaceable surface means.

According to another aspect of the invention there is provided displacement means comprises a rigid plate that provides the deflection surface of the compressible enclosure and the displacement means further comprises flexible means forming the compressible enclosure between the rigid plate and the reaction body.

According to yet another aspect of the invention there is provided energy conversion apparatus for generating energy from the wave motion of a body of liquid comprising a reaction body providing a reaction side facing oncoming waves, said reaction body carrying a closed flexible gas pump bag having front and rear sides of which the front side is deflected by an oncoming wave while the rear side obtains reactive support from the reaction side of the body whereby the bag is compressed by the oncoming wave and the bag expands when the wave recedes, means enabling the pumping of gas from the interior of the bag when compressed and the intake of fluid to the interior of the bag when it expands, and means for converting this movement of fluid into output energy in a more readily usable form.

An embodiment of the present invention will now be described by way of example, with reference to the accompanying drawings, some of which are diagrammatic and in which.

Figure 1:
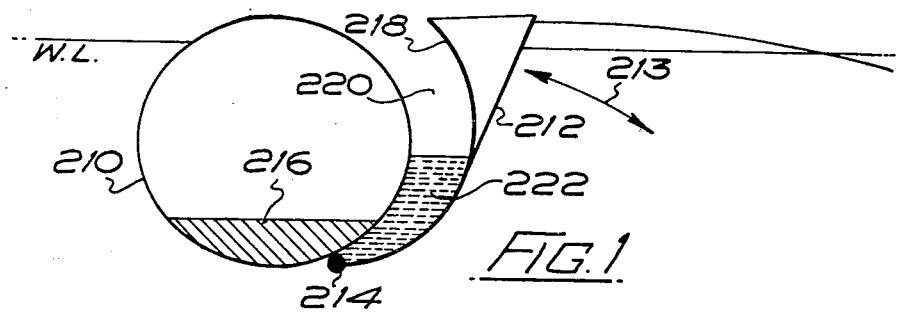
FIG. 1 is a sectional elevation showing a spine and displaceable surface means to illustrate the principle of apparatus according to the embodiment of the invention.

Referring to the drawings, a basic arrangement is shown clearly in FIG. 1. A cylindrical reaction body in the form of a spine 210 carries a plurality of displaceable units disposed in spaced fashion along one side of the spine. Each conversion unit includes a displaceable surface means in the form of a displaceable plate element 212, referred to herein as a flap, pivoted to the spine at the pivot axis 214.

The spine 210 and the flaps 212 are buoyancy members, the spine 210 having ballasting 216 to ensure that it will take up the position shown when buoyantly supported in calm water, for example as indicated by water line W.L. The inner face 218 of the flap 212 is curved to match the curvature of spine 210 but, in the calm water position shown in FIG. 1 a fluid cavity 220 will normally contain a quantity of liquid 222, which may be the same as the surrounding liquid e.g. sea water, and above the liquid 222 is a gaseous fluid in this case air. The cavity is in practice closed but is shown as being open to the atmosphere in FIG. 1, for the purposes of explanation.

To explain the basic principle of operation, assume that the cavity 220 between flap 212 and spine 210 is partly full of water at the mid-swing position, then the neutral position will be as shown in FIG. 1 with all weight and buoyancy moments balanced. With an increasing wave height the flap 212 will rotate anti-clockwise and will be resisted by the spring action of increasing water level and increase in air pressure in the cavity 220. With a decreasing wave height the flap 212 will rotate clockwise, and will likewise be resisted by the spring action of decreasing water level in the cavity 220 and reduction in air pressure. Arrow 213 indicates flap movement.

Figure 2:
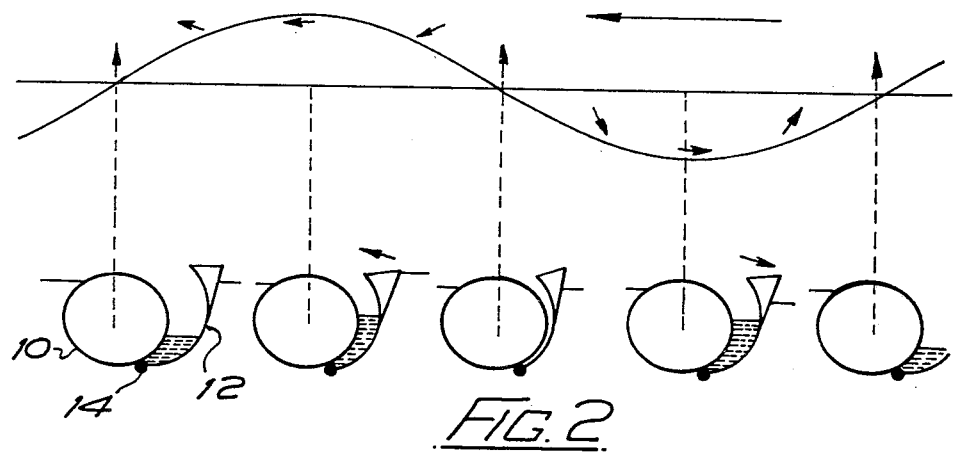
FIG. 2 shows relative displaceable surface means positions as related to a wave pattern of the body of liquid.

The mean water level in the cavity 220 is determined by the dynamic range of the flap 212 with respect to the mean position of the flap. Under no wave conditions, the cavity water level will be mean sea level with the flap angle determined by the spine-flap geometry and weight/buoyancy distribution. With increasing wave height, cavity water will be progressively extruded at the flap peak excursions thereby decreasing the mean water level within the cavity. FIG. 2 shows a range of flap positions as related to a simple sine wave pattern.

The steady state cavity water level at any particular sea state will be determined by the balance of water extrusion, the leakage, controlled or otherwise, into and out of the cavity and the air pressure. Inertia and spring rates of the flap 212 are functions of structural geometry and flap mass and the air to water volume ratio within the cavity 220 and hence may be tuned to the wave energy frequency band.

In accordance with the invention specific means for harnessing the swinging movements of the flap 212 is utilized and one example of this means is illustrated in FIGS. 3 to 7.

Figure 3:
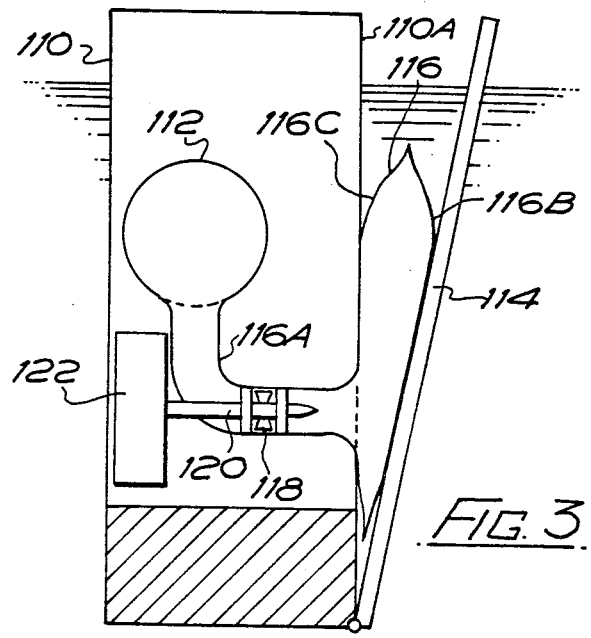
FIG. 3 is a sectional elevation of apparatus according to the embodiment of the invention.

In FIG. 3, the spine is indicated by numeral 110 and it will be seen that it is of rectangular configuration, and there is a common air conduit 112 therein. Between the spine 112 and each plate element 114 there is a sealed flexible air bag or bellows 116 defining a closed cavity 113, which communicates through a communication passage 116A with the duct 112. The bag has a front side 116B which is deflected by the plate element 114, and a rear side 116C which receives reactive support by the side 110A of the spine 110, which side 110A as shown extends upright in use. In the passage 116 is arranged a self-rectifying air turbine 118, the shaft 120 of which is coupled to an electrical generator 122. The self-rectifying air turbine operates to drive the shaft 120 unidirectionally regardless of whether or not air is being forced out of the bag 116 as the flap 114 moves towards the spine or when air is moving in the opposite direction by being drawn from the air duct 112 when the plate element 114 moves away from the spine 110. One such self-rectifying turbine is described and illustrated herein with reference to and by FIGS. 4 to 7.

As the plate element 114 moves back and forth relative to the spine 110, so the front 116B of the bag 116 is displaced towards the spine and the rear 116C receives reactive support from the spine side 110A and when the wave recedes, the bag relaxes or expands and so on, whereby air is alternately driven back and forth along the passage 116A to drive the turbine 120.

This method of converting the wave energy has the advantage that it achieves velocity proportional damping of the movement of the plate element as the torque input to the electrical generator is proportional to the velocity of the rotor, provided that there is a resistive load.

In the calm water condition with no pressure in the duct 112, the natural position of the plate element is closed position, i.e. lying against the spine. Therefore the first stage in actuating the apparatus is to pressurise the system with low pressure air to give an ambient pressure in the bag so that the plate elements open out to the desired mean position, the ambient air pressure then balancing the external water pressure. When a wave moves against each plate element, the pressure in the bag 116 will increase and air will flow through the turbine 118 to the main duct 112, and the turbine will be driven. As the wave recedes, the plate element will move outwards, the pressure in the cavity falling below the pressure in the main duct, so that air will flow back into the cavity and the turbine, by virtue of its self rectifying operation, will again be driven. There is a turbine 118 for each plate element 114.

The cavity, can as herein described with reference to FIGS. 1 and 2 be partly filled with liquid.

The plate elements 114 are rigid but the surface which faces the waves may in the alternative be defined by a flexible membrane.

Figure 4:
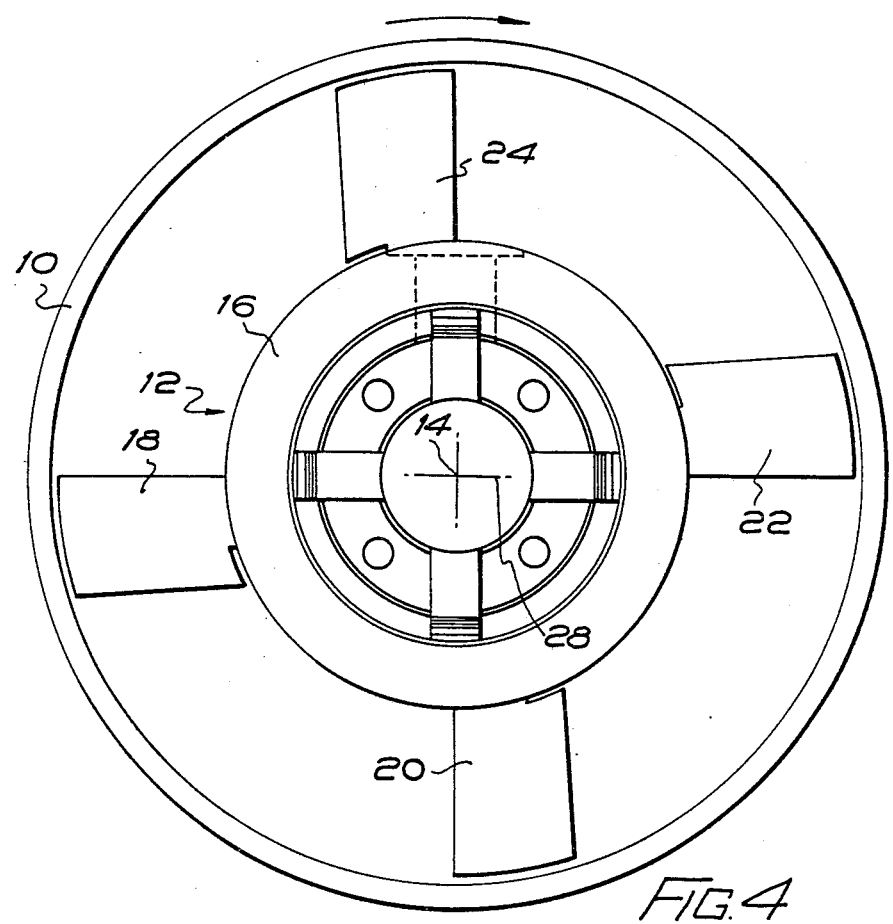
FIG. 4 shows a uni-directional self-rectifying turbine as used in the apparatus of FIG. 3, the view being along the axis of the turbine shaft.

Referring now to FIGS. 4 to 7 of the drawings, in FIG. 4 there is shown a self rectifying turbine comprising a cylindrical casing 10, in which is contained a rotor 12 having its axis indicated by numeral 14. The rotor comprises a bush 16 from which project four rotor blades 18, 20, 22 and 24. The rotor blades 18 to 24 are identical, and are identically mounted on the bush 16, and therefore only one blade, blade 22, and its mounting will be described in detail.

Figure 5:
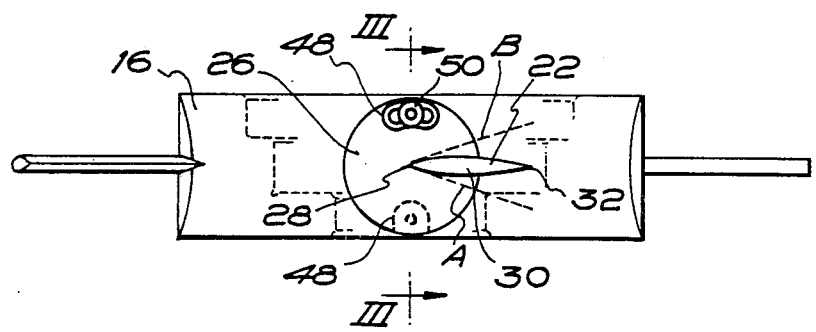
FIG. 5 is a side view of the turbine rotor shown in FIG. 4.

Referring to FIG. 5, the blade 22 is carried by plug 26 which is rotatable about an axis 28 which is radial with respect to the bush 16 and intersects axis 14 at a right angle. The axis 28 is also coincident with the leading edge of the blade 22, which has an aerofoil section as shown in FIG. 5, which is symmetrical about the axis 30, such axis 30 extending between the leading and trailing edges of the aerofoil section and being in a plane which is at right angles to the axis 14. The aerofoil section has its thickest cross sectional dimension nearer the leading edge (axis 28) on the trailing edge 32. The plug 26 and its mounting are shown in greater detail in FIGS. 6 and 7, and the plug will be seen to comprise a flange portion 34 and a shaft portion 36. The blade 22 is formed integrally with the flange portion 34, and the shaft portion 36 is mounted for free pivotal movement in the bush 16 by means of a needle bearing 38. The washer 40 on the end of shaft portion 36 provides a mounting for a thrust race 42 of the first bearing 44, which bearing 44 takes the thrust which will be generated by the centrifugal force of the blade 22 exerted during the rotation of the rotor 12.

Figure 6:
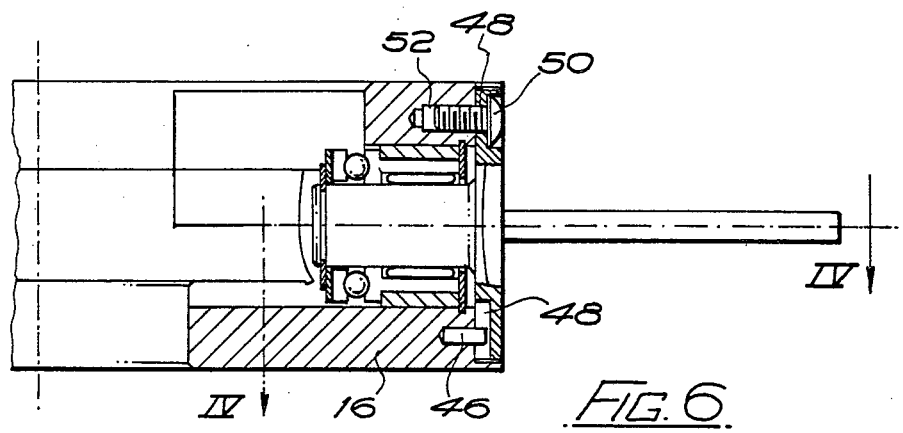
FIG. 6 is a sectional elevation of the turbine rotor shown in FIG. 5, the section being taken on the line III—III of FIG. 5.
Figure 7:
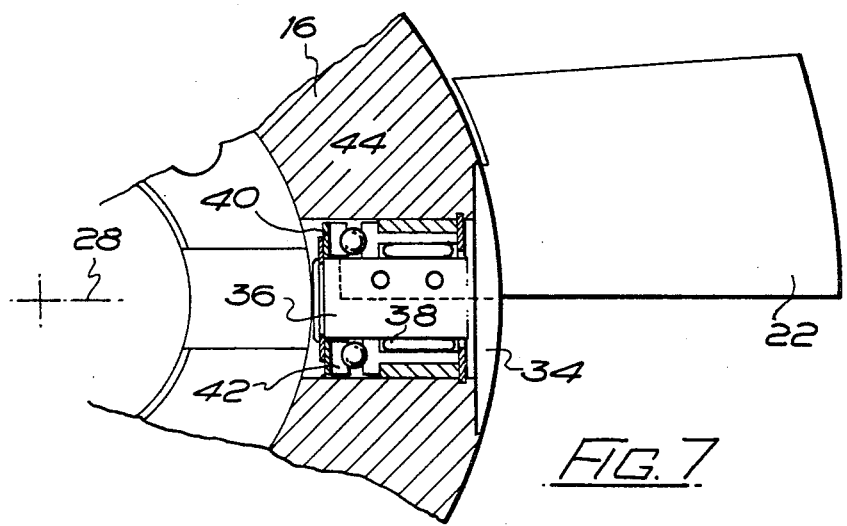
FIG. 7 is a sectional elevation taken on the line IV—IV of FIG. 6.

As shown in FIG. 6, a stock pin 46 is carried by the bush 16 and projects into a slot 48 in the inside surface of the flange portion 34, whereby the degree to which the blade 22 can swivel freely about axis 28 is limited.

Additionally, an elongated and curved aperture 48 in the flange portion 34 receives a locking screw 50, which screws into threaded bore 52 in the bush 16. The screw 50 an be tightened to lock the blade 22 in any adjusted position within the limits of its swivel movement, for example for the purposes of testing.

Although not shown in the drawings, it is pointed out that the centre of mass of each blade 18 to 22 is offset relative to the axis of the swivelling, such as axis 28 of the respective blade so that when the blades are free to swivel, and the rotor is in rotation, the blades, by virtue of the centrifugal force, will tend to take up the medial position shown in the drawing in which the axes of symmetry 30 lie in a plane which is at right angles to the axis 14.

To explain the operation of the turbine, assume that a flow of fluid, such as air, is passed along the inside of cylinder 10 in the direction of axis 14. The blades 18 to 24 will be pivoted about their pivoting axes, such as axis 28, whereby the angle of incidence between the flow of fluid and the aerofoil blades is less than 90°. Therefore, there is a reasonably high initial torque which commences rotation of the rotor. As the rotor speed increases, so the centrifugal force of the blades tending to return the blades to the FIG. 5 position increases, but because of the initial angle of incidence of less than 90°, the rotor will accelerate quickly up to speed so that when the blades return to the FIG. 5 position, in which the angle of incidence is very small, the speed will be sufficiently high to maintain rotation of the turbine whereby power can be extracted.

When the turbine is driven by reciprocating air flow from one direction along the inside of the casing 10, and then in the opposite direction, as in the case of the apparatus of FIG. 3, then initially the turbine blades 18 to 24 will swing between the positions A and B as shown in FIG. 5, with the alternating air flow.

The invention also provides an effective uni-directional turbine which has improved response characteristics by virtue of the free swivel mounting of the blades.

In an alternative arrangement, the blades 22 may be fixed blades which are locked in the median blade position shown in FIG. 5.

The present invention it is to be noted envisages the utilisation of apparatus which is for buoyant support by the body of liquid, as opposed to an apparatus which is for permanent fixture to the sea bed.

By such means, the difficulty of providing substantial support structures, and the limitation that the apparatus can only be used in relatively shallow water, are avoided.

The air which is used in the cavities 113 is low pressure air the use of which presents a number of advantages including that:

(a) It is non-polluting.
(b) It is available "in situ".
(c) Being a lighter medium it is more easily accelerated to high speeds. High turbine speeds—and therefore smaller, cheaper turbines and alternators are possible.
(d) There are fewer moving parts in the system.
(e) The "pumps" can be large, comparatively simple, cheap and few in number.

We claim:

1. Energy conversion apparatus for generating energy from the wave motion of a body of liquid comprising a reaction body providing a reaction side facing oncoming waves, said reaction body carrying a flexible gas pump bag having front and rear sides of which the front side is deflected by an oncoming wave while the rear side obtains reactive support from the reaction side of the body whereby the bag is compressed by the oncoming wave and the bag expands when the wave recedes, means enabling the pumping of gas from the interior of the bag when compressed and the intake of fluid to the interior of the bag when it expands, and means for converting this movement of fluid into output energy in a more readily usable form.

2. Energy conversion apparatus for generating energy from the wave motion of a body of liquid comprising, a reaction body carrying a displacement unit on one side of the body, the displacement unit comprising means providing a deflection surface which deflects towards and away from the reaction body under the influence of wave forces and means providing a cavity behind the deflection surface, the cavity being adapted to contain a gaseous fluid, a passageway coupling the interior of the cavity with a chamber of the reaction body so that the back and forth movement of the deflection surface causes pumping of gaseous fluid from the cavity to the chamber and vice versa, said cavity being adapted to contain a quantity of liquid therein above which the gaseous medium is located so that any such quantity of liquid will act to displace the deflection surface away from the reaction body, and means for converting the pumping of the gaseous fluid into energy in a more readily usable form.

3. Energy conversion apparatus for generating energy from the wave motion of a body of liquid comprising:

(a) an elongated reaction body having a gas filled chamber therein,
(b) a plurality of displacement means spaced along and secured to the reaction body at one side thereof, each displacement means providing a compressible enclosure containing a gas, the compressible enclosure having a deflection surface which moves toward and away from the reaction body under the influence of wave forces so that the enclosure acts as a gas pump,
(c) a separate gas passageway for each displacement means connecting the interior of the compressible enclosure with the chamber in the reaction body which chamber is common to all displacement means whereby the back and forth movement of each deflection surface causes pumping of gas from the enclosure to the chamber and vice versa through the passageway, and (d) a self-rectifying turbine disposed in the passageway whereby the turbine is driven unidirectionally by movement of fluid along the passageway, the self-rectifying turbine thereby providing output energy.

4. Energy conversion apparatus according to claim 3, wherein the reaction body is long enough to span several wave crests so that some displacement means will be out of phase relative to others so that the air will be exchanged between displacement means.

5. Energy conversion apparatus according to claim 4, wherein the gas filled chamber is pressurised to provide a mean working pressure in the the compressible enclosures.

6. The apparatus according to claim 4, wherein said compressible enclosure is adapted to accommodate a quantity of liquid below the gas in the enclosure.

7. The apparatus according to claim 4, wherein the displacement means comprises a rigid plate and means pivotally attaching the rigid plate to the reaction body.

8. The apparatus according to claim 4, wherein the inertia of the reaction body is large relative to the inertia of the means providing the deflection surface.

9. The apparatus according to claim 4, wherein the reaction body is buoyantly supportable and is ballasted to cause the reaction body to assume a predetermined attitude in a calm body of water.

10. The apparatus according to claim 9, wherein the elongated reaction body is of greater cross-sectional dimension in one direction than in the other, and the ballast of the reaction body causes the reaction body to assume a predetermined attitude in calm water such that the larger cross sectional dimension is upright.

11. The apparatus according to claim 4, wherein the displacement means comprises a flexible membrane that provides the deflection surface of the compressible enclosure.

12. The apparatus according to claim 4, wherein the displacement means comprises a rigid plate that provides the deflection surface of the compressible enclosure and the displacement means further comprises flexible means forming the compressible enclosure between the rigid plate and the reaction body.

* * * * *